US012030426B2

(12) United States Patent
Sato et al.

(10) Patent No.: US 12,030,426 B2
(45) Date of Patent: Jul. 9, 2024

(54) LEVER OPERATION DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Yuki Sato, Aichi-ken (JP); Nobuyuki Ishigure, Aichi-ken (JP); Tadashi Usuya, Aichi-ken (JP); Akio Nishiyama, Aichi-ken (JP); Masahiro Kato, Aichi-ken (JP); Shinji Hara, Aichi-ken (JP); Takayuki Aoki, Toyota (JP); Ryusuke Ohta, Toyota (JP); Toshihiko Kosugi, Toyota (JP); Shinji Matsubara, Toyota (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 159 days.

(21) Appl. No.: 17/838,353

(22) Filed: Jun. 13, 2022

(65) Prior Publication Data
US 2022/0396199 A1    Dec. 15, 2022

(30) Foreign Application Priority Data

Jun. 15, 2021 (JP) ................. 2021-099123

(51) Int. Cl.
*B60Q 1/14*    (2006.01)
(52) U.S. Cl.
CPC ......... *B60Q 1/1469* (2013.01); *B60Q 1/1484* (2013.01)

(58) Field of Classification Search
CPC ............... B60Q 1/1469; B60Q 1/1484; B60Q 1/1476; B60Q 1/1453; B60Q 1/1461; B60Q 1/34; B60Q 1/14; B60K 2026/00; B60K 2026/028; B62D 1/00; B62D 1/02; B62D 1/04; B62D 1/046; B62D 1/08; B62D 1/105; B62D 1/12; B62D 1/14; B62D 1/16; B62D 1/28; B60R 16/02; H01H 11/00; H01H 25/04
USPC ...................................................... 200/61.54
See application file for complete search history.

(56) References Cited

U.S. PATENT DOCUMENTS

2010/0101921 A1\*  4/2010  Howie ................. B60Q 1/1469
                                                    200/61.54
2021/0276606 A1\*  9/2021  Ishigure ................ B60K 35/00

FOREIGN PATENT DOCUMENTS

JP        2004-273250 A     9/2004

\* cited by examiner

*Primary Examiner* — Anthony R Jimenez
(74) *Attorney, Agent, or Firm* — Studebaker & Brackett PC

(57) ABSTRACT

A lever operation device includes an operation lever which rotates integrally with a steering wheel of a vehicle and receives operations at least in upward and downward directions and around which a predetermined region is set so as to prevent the operation lever from contacting with a leg of a user seated in a driver's seat when the steering wheel is rotated to a maximum steering angle, and an operation portion that is arranged on the operation lever so as not to be located out of the region and includes plural operating positions each assigned an executable function.

9 Claims, 7 Drawing Sheets

LEVER OPERATION DEVICE

CROSS-REFERENCE TO RELATED APPLICATIONS

The present patent application claims the priority of Japanese patent application No. 2021/099123 filed on Jun. 15, 2021, and the entire contents of Japanese patent application No. 2021/099123 are hereby incorporated by reference.

TECHNICAL FIELD

The present invention relates to a lever operation device.

BACKGROUND ART

A combination switch is known which is provided with an operation lever arranged in the vicinity of a steering wheel of a motor vehicle so as to be pivotally operable, and an operation knob that is arranged at a tip of the operation lever and rotates about an axis of the operation lever (see, e.g., Patent Literature 1).

This combination switch is configured to activate or stop a rear wiper of a vehicle by a rotation operation on the operation knob.

CITATION LIST

Patent Literature

Patent Literature 1: JP 2004/273250 A

SUMMARY OF INVENTION

If the combination switch is mounted so as to rotate with the steering wheel, the operation lever may come into contact with a leg of a user seated in a driver's seat when the steering wheel is turned not less than 90°. The combination switch also has a problem that operability of the operation knob decreases if simply reducing the length of the operation lever to avoid contact.

It is an object of the invention to provide a lever operation device configured such that a decrease in operability is suppressed while avoiding contact with a leg of a user.

According to an aspect of the invention, a lever operation device comprises:

- an operation lever which rotates integrally with a steering wheel of a vehicle and receives operations at least in upward and downward directions and around which a predetermined region is set so as to prevent the operation lever from contacting with a leg of a user seated in a driver's seat when the steering wheel is rotated to a maximum steering angle; and
- an operation portion that is arranged on the operation lever so as not to be located out of the region and comprises a plurality of operating positions each assigned an executable function.

Advantageous Effects of Invention

According to an embodiment of the invention, it is possible to suppress a decrease in operability while avoiding contact with a leg of a user.

DESCRIPTION OF EMBODIMENTS

Summary of the Embodiments

A lever operation device in the embodiments is generally composed of an operation lever which rotates integrally with a steering wheel of a vehicle and receives operations at least in upward and downward directions and around which a predetermined region is set so as to prevent the operation lever from contacting with a leg of a user seated in a driver's seat when the steering wheel is rotated to a maximum steering angle, and an operation portion that is arranged on the operation lever so as not to be located out of the region and has plural operating positions each assigned an executable function.

The operation portion of this lever operation device is provided in the region where the leg of the user does not come into contact therewith even when the steering wheel is rotated. Therefore, as compared to the case where such a configuration is not adopted, it is possible to suppress a decrease in operability while avoiding contact with the leg of the user.

First Embodiment (General Configuration of a Lever Operation Device 1)

Figure 1A:
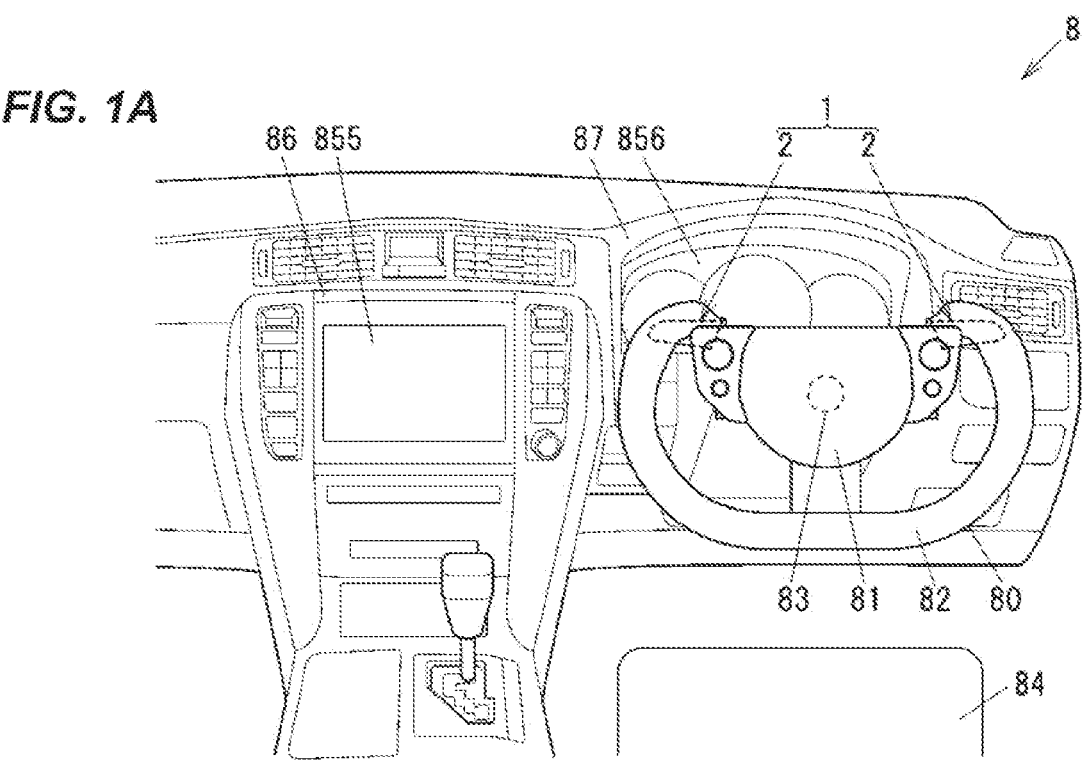
FIG. 1A is a diagram illustrating an example of a steering wheel on which a lever operation device in the first embodiment is arranged.
Figure 1B:
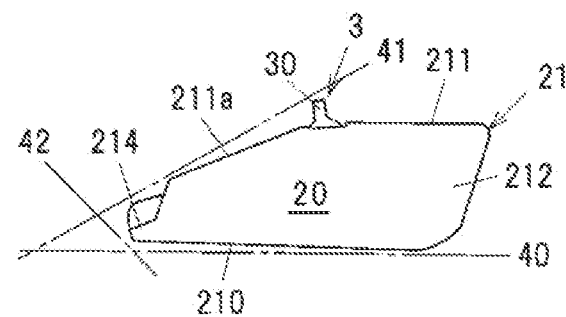
FIG. 1B is a top view showing an example of an end portion of an operation lever.
Figure 1C:
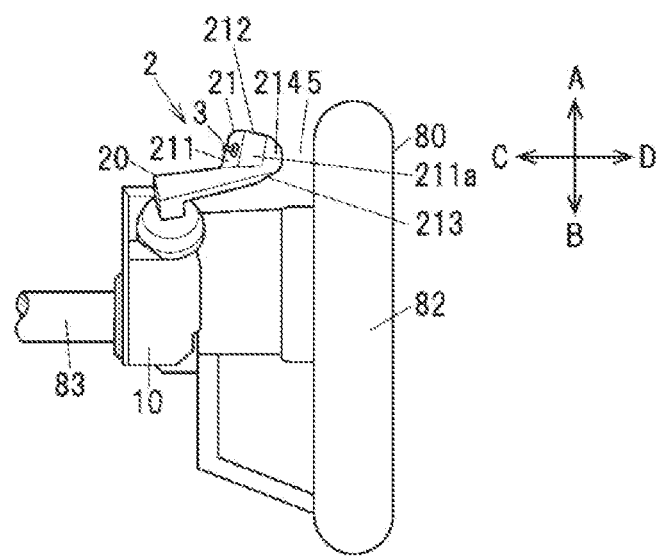
FIG. 1C is a side view showing an example of the lever operation device.
Figure 2A:
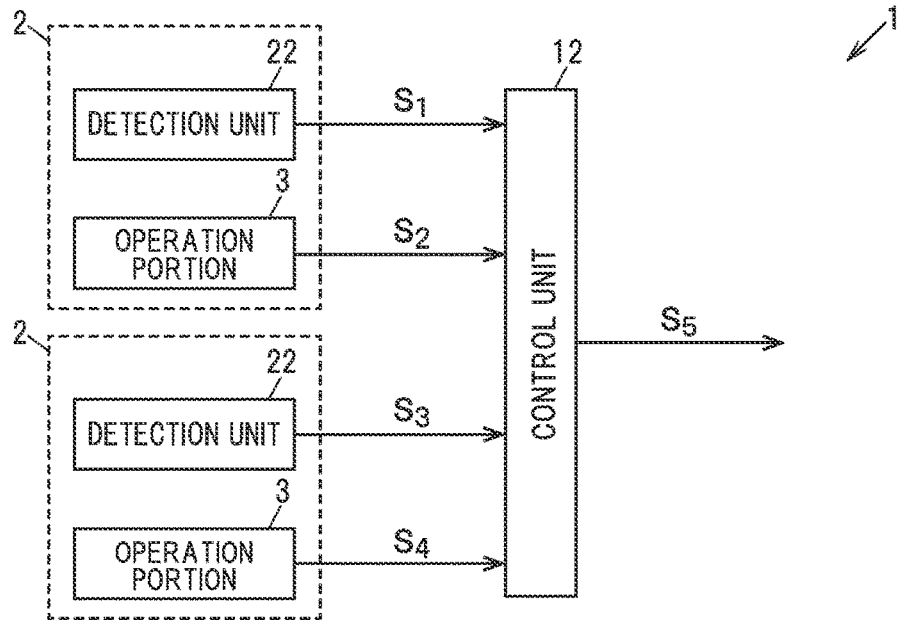
FIG. 2A is an example block diagram illustrating the lever operation device in the first embodiment.
Figure 2B:
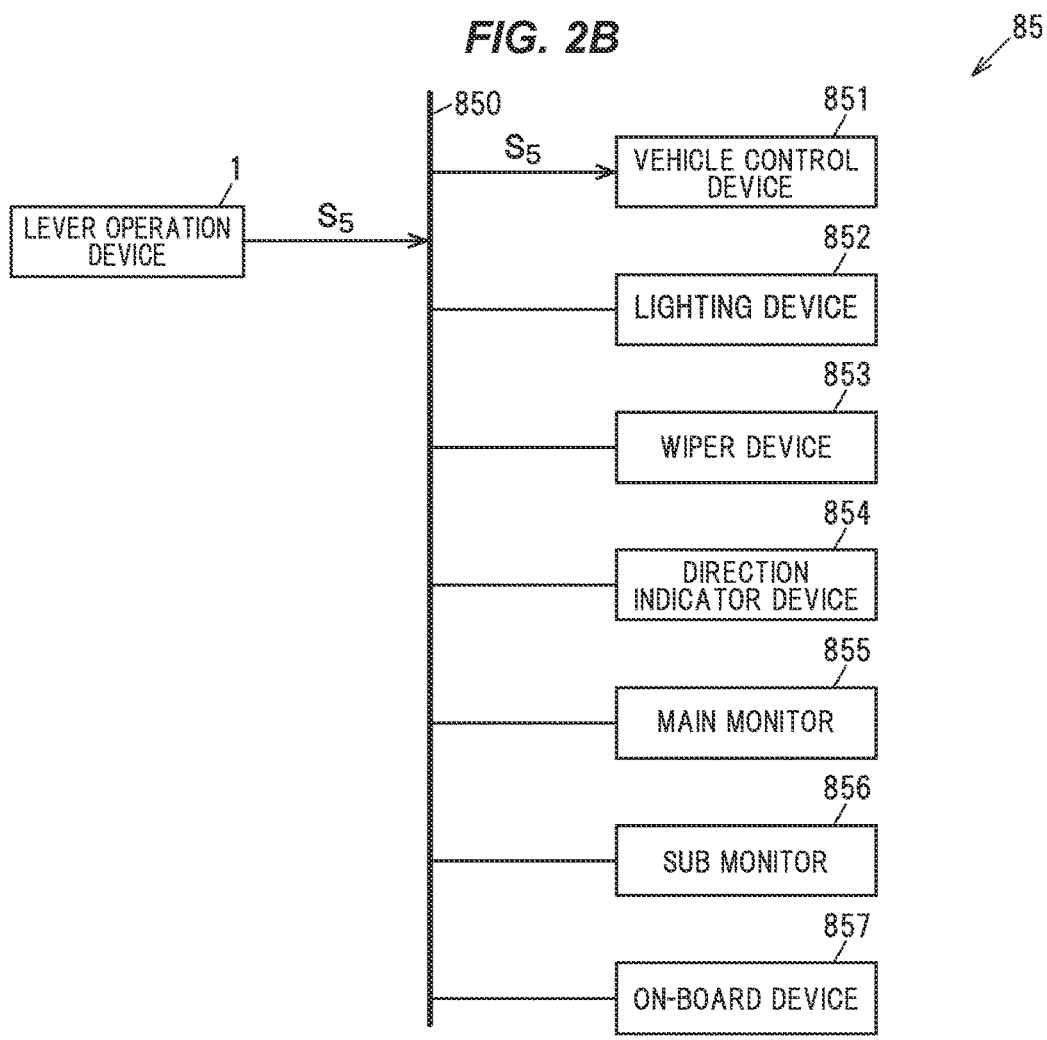
FIG. 2B is an example block diagram illustrating an in-vehicle communication system of a vehicle.

FIG. 1A is a diagram illustrating an example of a steering wheel on which a lever operation device is arranged, FIG. 1B is a top view showing an example of an end portion of an operation lever, and FIG. 1C is a side view showing an example of the lever operation device. FIG. 2A is an example block diagram illustrating the lever operation device, and FIG. 2B is an example block diagram illustrating an in-vehicle communication system of a vehicle. In each drawing of the embodiments described below, a scale ratio may be different from an actual ratio. In addition, in FIGS. 2A and 2B, flows of main signals and information are indicated by arrows.

As shown in FIGS. 1A to 1C, the lever operation device 1 is generally composed of an operation lever 20 which rotates integrally with a steering wheel 80 of a vehicle 8 and receives operations at least in upward and downward directions and around which an allowed existence region 4 as a predetermined region is set so as to prevent the operation lever from contacting with a leg of a user seated in a driver's seat when the steering wheel 80 is rotated to a maximum steering angle, and an operation portion 3 that is arranged on the operation lever 20 so as not to be located out of the allowed existence region 4 (shown in FIG. 3B) and has plural operating positions each assigned an executable function.

In more particular, the lever operation device 1 has the operation lever 20 and the operation portion 3 that is arranged on a side surface of the operation lever 20 within the allowed existence region 4, has a reference operating position and first and second operating positions with the reference operating position therebetween, is assigned plural functions switched in a sequence that is set according to an operation, switches the plural functions in a first sequence according to an operation in a direction toward the first operating position, and switches the plural functions in a second sequence opposite to the first sequence according to an operation in a direction toward the second operating position.

As shown in FIG. 1A, the lever operation device 1 in the first embodiment includes lever operation units 2 attached to the left and right sides of a housing 10. The housing 10 is attached to the steering wheel 80, as shown in FIG. 1C. The lever operation unit 2 includes the operation lever 20 having an end portion 21, and a detection unit 22 to detect an operating position of the operation lever 20. In FIG. 2A, the lever operation unit 2 on the left when viewed from the user is shown on the upper side of the page, and the lever operation unit 2 on the right is shown on the lower side of the page. Next, the left lever operation unit 2 will be mainly described.

As shown in FIG. 2A, the lever operation device 1 includes a control unit 12 that determines an operation direction of the operation lever 20. As an example, the lever operation device 1, together with operating objects, constitutes an in-vehicle communication system 85, as shown in FIG. 2B.

As an example, the lever operation device 1, a vehicle control device 851, a lighting device 852, a wiper device 853, a direction indicator device 854, a main monitor 855, a sub monitor 856 and on-board devices 857 are interconnected through an in-vehicle LAN (=Local Area Network) 850 in the in-vehicle communication system 85.

The vehicle control device 851 comprehensively controls the vehicle 8 and has a self-driving function, etc. The vehicle control device 851 controls, through the in-vehicle LAN 850, the operating objects of the lever operation device 1 based on operation information $S_5$ (described later) acquired from the lever operation device 1.

The lighting device 852 controls turning on and off of headlamps and side marker lights of the vehicle 8. The wiper device 853 controls driving of wipers. The direction indicator device 854 controls turning on and off of left and right direction indicator lamps of the vehicle 8.

The main monitor 855 is an organic EL (=Electro-Luminescence) display, as an example. As shown in FIG. 1A, the main monitor 855 is arranged on a center console 86. A map of the current location and destination and a screen for various settings of the vehicle 8 are displayed on the main monitor 855.

The sub monitor 856 is an organic EL display, as an example. As shown in FIG. 1A, the sub monitor 856 is arranged on an instrument panel 87 in front of the user seated in the driver's seat 84. A speedometer, etc., is displayed on the sub monitor 856.

The on-board devices 857 are, e.g., a navigation device, a music reproduction device, an image reproduction device, and an air conditioning device, etc.

The in-vehicle LAN 850 is, e.g., a vehicular network which enables reciprocal exchange of signals or information with wire or wireless, such as CAN (Controller Area Network) or LIN (Local Interconnect Network).

The steering wheel 80 includes a base portion 81 to which a steering shaft 83 is connected, and a grip portion 82 which is a member to be gripped by the user. A horn device and an airbag device, etc., are mounted on the base portion 81.

The steering wheel in the first embodiment has a non-circular irregular-shaped grip portion 82 as an example, but it is not limited thereto. The grip portion 82 may be circular.

(Configuration of the Control Unit 12)

The control unit 12 is, e.g., a microcomputer composed of a CPU (=Central Processing Unit) performing calculation and processing, etc., of the acquired data according to a stored program, and a RAM (=Random Access Memory) and a ROM (=Read Only Memory) as semiconductor memories, etc. The ROM stores, e.g., a program for operation of the control unit 12. The RAM is used as, e.g., a storage area to temporarily store calculation results, etc.

The control unit 12 determines an operation performed on each operation lever 20 based on a detection signal $S_1$ and a detection signal $S_3$ acquired from the detection units 22 of the left and right lever operation units 2 and outputs the result as the operation information $S_5$.

The control unit 12 is also connected to the operation portions 3 respectively arranged on the left and right lever operation units 2. The control unit 12 determines an operating position of each operation portion 3 based on a detection signal $S_2$ and a detection signal $S_4$ acquired from the left and right operation portions 3 and outputs the result as the operation information $S_5$. The operation information $S_5$ is information that includes at least information about the operation on each operation lever 20 and information about an operating position of each operation portion 3.

(Configuration of the Operation Lever 20)

Figure 3A:
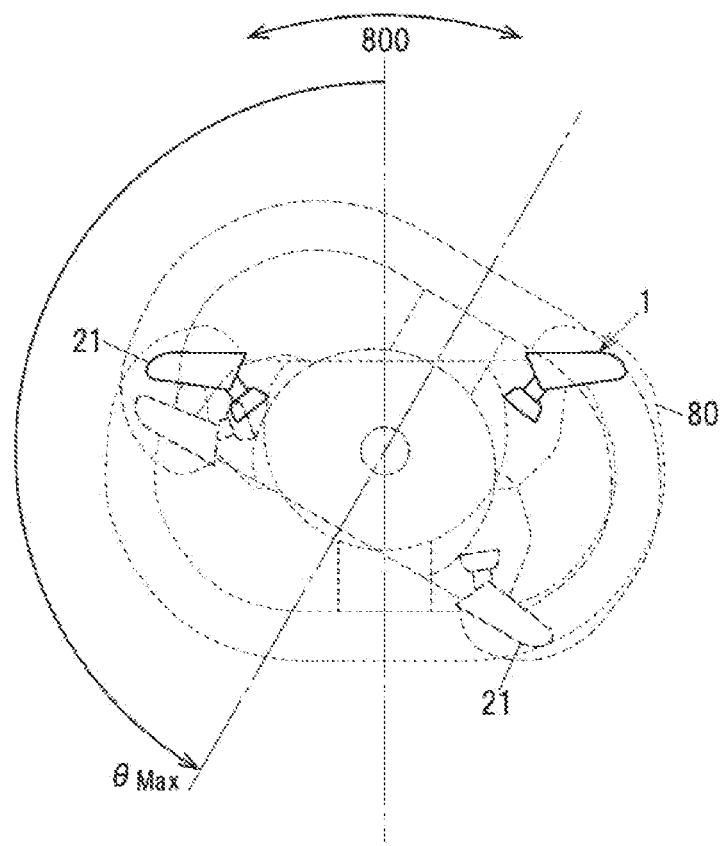
FIG. 3A is an example diagram illustrating the steering wheel when viewed from the front.
Figure 3B:
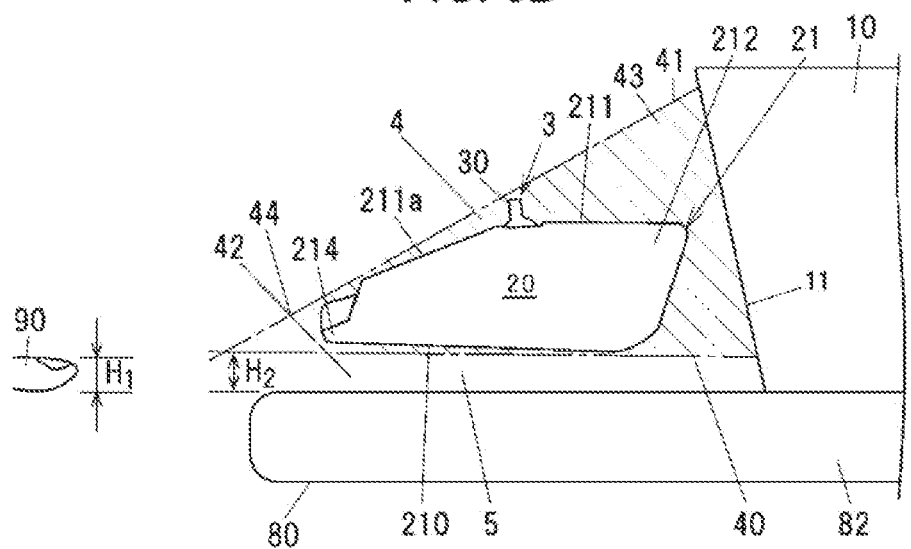
FIG. 3B is an example diagram illustrating the steering wheel when viewed from above.

FIG. 3A is an example diagram illustrating the steering wheel when viewed from the front, and FIG. 3B is an example diagram illustrating the steering wheel when viewed from above. $\theta_{Max}$ shown in FIG. 3A is the maximum steering angle of the steering wheel 80.

The maximum steering angle $\theta_{Max}$ of the steering wheel 80 is in a range of not less than 90° and not more than 180° to left and right from a reference position 800, as shown in FIG. 3A. The maximum steering angle $\theta_{Max}$ in the first embodiment is 150°, as an example. FIG. 3A shows the steering wheel 80 located at the reference position 800 and the steering wheel 80 rotated 150° to the left. The reference position 800 is a steering position of the steering wheel 80 when the vehicle 8 moves straight ahead.

As shown in FIG. 1C, the operation lever 20 is supported by the housing 10 so as to be operable in upward and downward directions (an arrow A direction and an arrow B direction) and in forward and rearward directions (an arrow C direction and an arrow D direction) that intersect the upward and downward directions.

Operating the left operation lever 20 can, e.g., turn on the right direction indicator lamps when operated in the upward direction and turn on the left direction indicator lamps when operated in the downward direction. Operating this operation lever 20 can also, e.g., switch the headlamps from low beam to high beam when operated in the forward direction which is a direction of pushing away when viewed from the user, and can switch the headlamps to high beam only during when being operated in the rearward direction which is a direction of pulling toward the user.

The right operation lever 20 is attached to the housing 10 so as to be operable, e.g., only in the upward and downward directions. This operation lever 20 can change, e.g., the transmission state of the vehicle 8, but it is not limited thereto.

As shown in FIG. 1B, the end portion 21 has a tapered shape since an inclined surface 211a inclined toward a tip is formed on a back surface 211. The back surface 211 is a surface on the back side as seen from the user seated in the driver's seat 84. A front surface 210 is a surface on the user side. The operation portion 3 is arranged on a surface not visible to the user, i.e., on the back surface 211.

The front surface 210 is within a boundary line 40 indicated by a dashed-dotted line in FIG. 1B. The back surface 211 is within a boundary line 41 indicated by a dashed-dotted line in FIG. 1B. The boundary line 40 and the boundary line 41 define the allowed existence region 4.

As shown in FIG. 3B, a gap 5 between the operation lever 20 and the steering wheel 80 is wider than one predetermined finger as a reference for width and narrower than two fingers. A width $H_1$ of a finger 90, which is a reference for width, is determined based on a width of an index finger of average adult and is about 2 cm, as an example. Thus, a width $H_2$ of the gap 5 between the steering wheel 80 and the front surface 210 of the end portion 21 of the operation lever 20 is in a range of $H_1 < H_2 < 2H_1$.

As described above, the gap 5 is determined based on the width $H_1$ of one finger. That is, the gap 5 is just enough for one finger to fit but not for two fingers, as shown in FIG. 3B. Therefore, operating the end portion 21 by pinching and rotating is difficult for the user. Since the gap 5 is narrow, the user can easily operate the end portion 21 while gripping the grip portion 82.

The operation lever 20 is configured such that a portion on the housing 10 side is formed thin-columnar, the tip is bent toward the steering wheel 80, and the end portion 21 is provided at the far end from the bend. The shape of the operation lever 20 is not limited thereto and may be a straight shape from the base to the end portion 21.

(Configuration of the Detection Unit 22)

The detection unit 22 detects operations performed on the operation lever 20 in the directions of the arrows A to D. The detection unit 22 is arranged on each of the left and right operation levers 20.

The detection unit 22 may be configured to, e.g., detect an operation in a contactless manner by a magnet arranged on the operation lever 20 and a magnetic sensor arranged on the housing 10, or may be configured to detect an operation by a movable contact attached to the operation lever 20 and a fixed contact arranged on the housing 10, but it is not limited thereto. The detection unit 22 in the first embodiment is configured to detect an operation by a magnet and a magnetic sensor, as an example.

(Configuration of the Operation Portion 3)

Figure 4A:
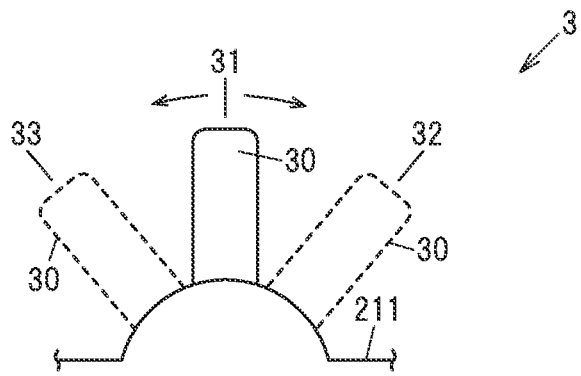
FIG. 4A is a diagram illustrating an example of operating positions of the lever operation device in the first embodiment.
Figure 4B:
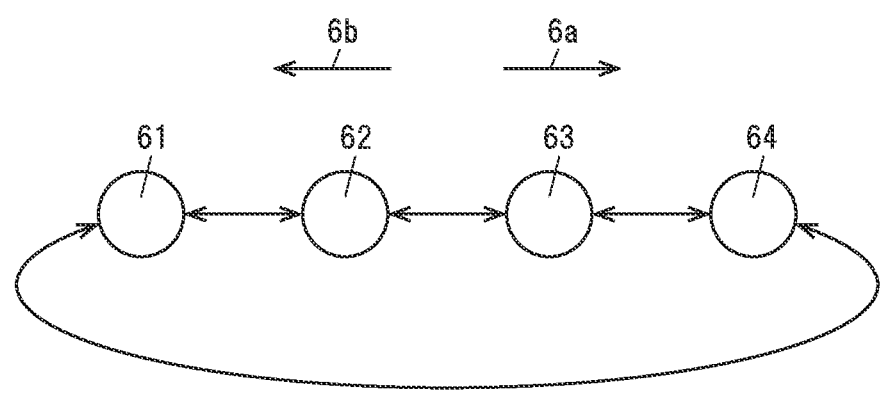
FIG. 4B is a diagram illustrating an example of first and second sequences where four functions are assigned.
Figure 4C:
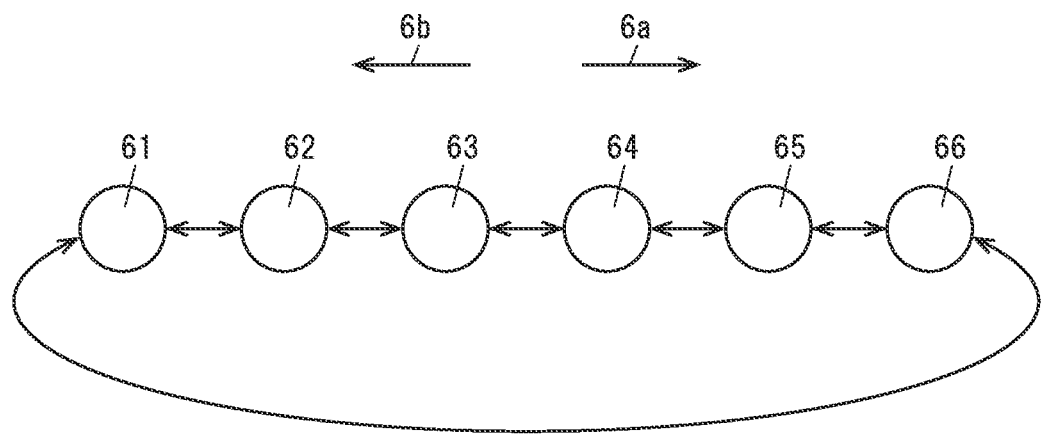
FIG. 4C is a diagram illustrating an example of the first and second sequences where six functions are assigned.

FIG. 4A is a diagram illustrating an example of the operation portion, FIG. 4B is an explanatory diagram illustrating an example of first and second sequences of switching functions, and FIG. 4C is an explanatory diagram illustrating an example of the first and second sequences of switching functions in a modification.

The operation portion 3 is a mechanical switch having plural operating positions. As an example, the mechanical switch in the first embodiment is a small toggle switch, as shown in FIG. 4A. This toggle switch performs a momentary action.

An operation member 30 of the operation portion 3 before being operated is located at a reference operating position 31 and can be operated from the reference operating position 31 to a first operating position 32 and a second operating position 33. In other words, the operation portion 3 has three positions: the reference operating position 31, the first operating position 32 and the second operating position 33.

The first operating position 32 is an operating position of the operation member 30 when operated and shifted by extending a finger while gripping the steering wheel 80. The second operating position 33 is an operating position of the operation member 30 when operated and shifted by pulling a finger while gripping the steering wheel 80.

The operation member 30 has a columnar shape. The operation member 30 is configured to be tillable to the first operating position 32 and the second operating position 33, i.e., to be tilt operated.

When the user operates the operation member 30 from the reference operating position 31 to the first operating position 32 and then removes his/her finger from the operation member 30, the operation member 30 performs a momentary action to return from the first operating position 32 to the reference operating position 31.

Also, when the user operates the operation member 30 from the reference operating position 31 to the second operating position 33 and then removes his/her finger from the operation member 30, the operation member 30 performs a momentary action to return from the second operating position 33 to the reference operating position 31.

The left and right operation portions 3 generate the detection signal $S_2$ and the detection signal $S_4$ corresponding to the reference operating position 31, the first operating position 32 and the second operating position 33 of the operation members 30, and output them to the control unit 12.

The operation portion 3 is arranged at the end portion 21 so as not to be located out of the allowed existence region 4 before and after the operation member 30 is operated. The operation portion 3 in the first embodiment is arranged on the back surface 211, but it is not limited thereto. The operation portion 3 may be arranged on an upper surface 212 or a lower surface 213, etc., as long as it is within the allowed existence region 4. Next, the allowed existence region 4 will be described.

(The Allowed Existence Region 4)

Figure 5A:
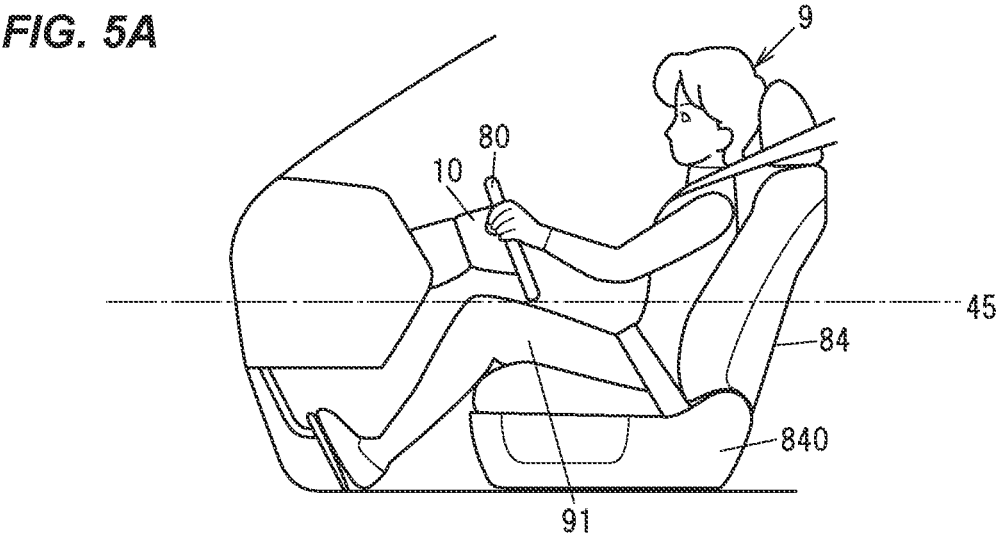
FIGS. 5A to 5C are explanatory diagrams illustrating an example of an allowed existence region for the lever operation device in the first embodiment.
Figure 5B:
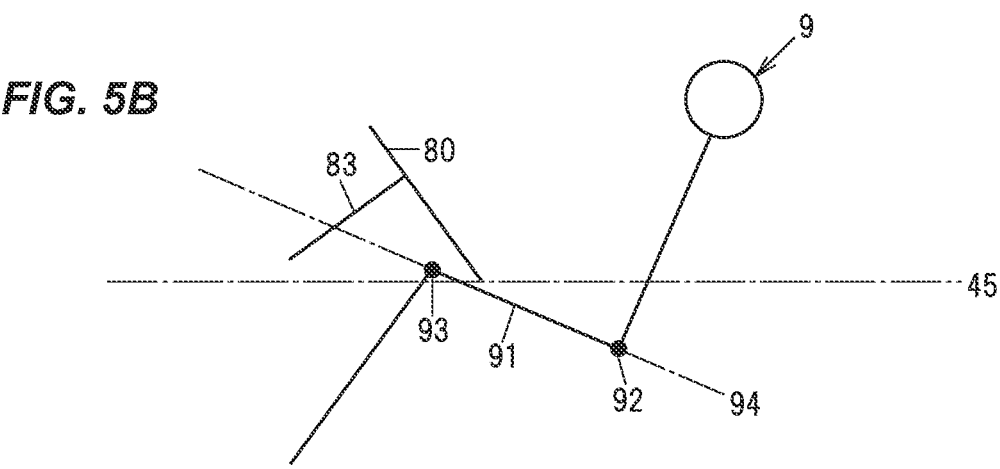
Figure 5C:
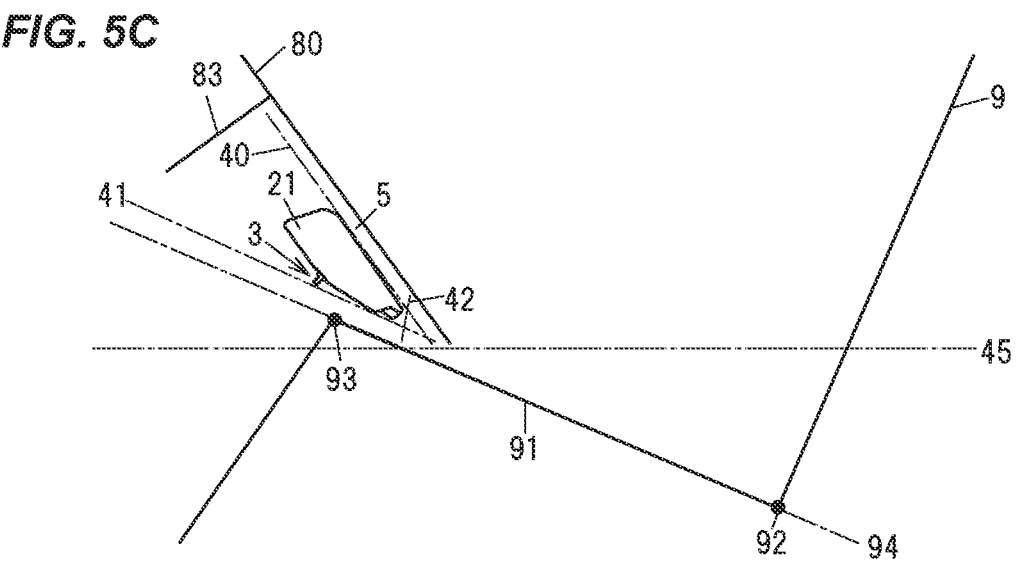

FIGS. 5A to 5C are explanatory diagrams illustrating an example of the allowed existence region. FIG. 5A shows an example in which a leg 91 of a user 9 is located higher than the lowest point of the steering wheel 80. FIG. 5B shows an example of a horizontal line 45 passing through the lowest point of the steering wheel 80. FIG. 5C is an example of an enlarged view of FIG. 5B showing the area near the steering wheel 80 and the leg 91 of the user 9.

The allowed existence region 4 is set around the operation lever 20. As shown in FIG. 3B, the allowed existence region 4 is defined surrounded by the boundary line 40 to define the gap 5 between the grip portion 82 of the steering wheel 80 and the front surface 210 of the operation lever 20, the boundary line 41 to prevent the operation lever 20 from contacting with a leg of the user seated in the driver's seat 84, and a boundary line 42 to prevent the end portion 21 of the operation lever 20 from contacting with a finger of the user when the user grips the grip portion 82 of the steering wheel 80, and a side surface 11 of the housing 10. In FIG. 3B, the allowed existence region 4 is shaded with diagonal lines.

The allowed existence region 4 is also the inside of a three-dimensional shape formed when a plane 43 surrounded by the boundary lines 40 to 42 described above and the housing 10 is rotated to the maximum steering angle $\theta_{Max}$ of the steering wheel 80, as shown in FIG. 3B. However, the allowed existence region 4 is practically considered to be located around the operation lever 20 since it is necessary that the user can operate the operation portion 3 while gripping the steering wheel 80.

In addition, when the steering wheel 80 is viewed from the front, a boundary 44 of the allowed existence region 4 is located inside the steering wheel 80, as shown in FIGS. 3A and 3B. This is because if the allowed existence region 4 is also present outside the steering wheel 80, there is a possibility of contact when the steering wheel 80 is rotated such that the end portion 21 or the operation portion 3 passes above the leg of the user, and it is also to suppress contact of fingers holding the grip portion 82 since the operation lever 20 is close to the steering wheel 80. In FIG. 3A, the steering wheel 80 is rotate left to the maximum steering angle $\theta_{Max}$. In this case, the left the end portion 21 passes above the leg of the user. Therefore, if the end portion 21 or the operation portion 3 is located outside the steering wheel 80, there is a possibility of contact.

The boundary line 40 is a line that defines the gap 5 between the steering wheel 80 and the end portion 21, as described above. Also, the boundary line 42 is a line on or outside of which the finger does not come into contact with an end face 214 of the end portion 21 when the user is holding the steering wheel 80, as shown in FIG. 5B. The operation lever 20 is arranged close to the steering wheel 80. Therefore, if the finger comes into contact with the end portion 21 in the state in which the user is holding the grip portion 82 to drive, it may cause an erroneous operation or a decrease in operability. The boundary line 42 is set so that the finger does not easily come into contact with the end portion 21 when holding the grip portion 82, i.e., when holding the grip portion 82 without extending the finger.

As shown in FIGS. 5A to 5C, the boundary line 41 is set based on a defining line 94 that is defined based on a hip-point 92 and a knee 93 of the user 9 seated in the driver's seat 84. In FIGS. 5B and 5C, a line connecting the hip-point 92 to the knee 93 is the defining line 94. The boundary line 41 is a line obtained when the defining line 94 is moved parallel to itself toward the steering wheel 80, as shown in FIG. 5C.

As shown in FIG. 5A, the knee 93 may be located above the horizontal line 45 which includes the lowest point of the steering wheel 80, depending on an angle or shape of a seating surface 840 of the driver's seat 84, the position of the steering wheel 80 adjusted by tilting or telescoping, or the physique or sitting position of the user, etc. In this regard, the legs 91 of the user 9 are located left and right of the lowest point of the steering wheel 80 and are more likely to come into contact with the end portions 21 if the end portions 21 are located outside the steering wheel 80.

Even if the knee 93 of the user 9 is located above the horizontal line 45, the operation lever 20 does not come into contact with the leg 91 of the user 9 since the end portion 21 is located within the boundary line 41, as shown in FIG. 5C. The end portion 21 is not located out of the allowed existence region 4 by having the inclined surface 211a and is easy to operate while avoiding contact with the leg 91 as shown in FIG. 5C.

(Functions Operated by the Operation Portion 3)

The operation portion 3 of the left lever operation unit 2 is assigned at least a function of turning off the headlamps and the side marker lights of the vehicle 8 and, according to the operating positions thereof, is assigned a function of turning off and on the headlamps according to ambient brightness, a function of turning on the side marker lights, and a function of turning on the headlamps.

The headlamps and the side marker lights are controlled by the lighting device 852. The operation portion 3 is assigned a first function 61 as the function of turning off the headlamps and the side marker lights, a second function 62 as the function of turning off and on the headlamps according to ambient brightness, a third function 63 as the function of turning on the side marker lights, and a fourth function 64 as the function of turning on the headlamps.

As shown in FIGS. 4A and 4B, the operation portion 3 switches the functions in a first sequence 6a, sequentially from the first function 61 to the fourth function 64, according to an operation in a direction toward the first operating position 32. A right arrow in FIGS. 4A and 4B indicates the direction of the first sequence 6a. When the operation portion 3 is not operated, the first function 61 is assigned to the reference operating position 31.

When the user operates the operation portion 3 from the reference operating position 31 to the first operating position 32, the function is switched from the first function 61 to the second function 62 according to the first sequence 6a. When the user subsequently operates from the reference operating position 31 to the first operating position 32, the function is switched from the second function 62 to the third function 63. That is, each time the user operates to the first operating position 32, the function is switched from the first function 61, to the second function 62, to the third function 63, and to the fourth function 64. In the first sequence 6a, the function is switched from the fourth function 64 to the first function 61 in a looping manner, as shown in FIG. 4B. At this time, the currently selected function is displayed on the sub monitor 856.

As shown in FIGS. 4A and 4B, the operation portion 3 switches the functions in a second sequence 6b opposite to the first sequence 6a, sequentially from the first function 61 to the fourth function 64, according to an operation in a direction toward the second operating position 33. A left arrow in FIGS. 4A and 4B indicates the direction of the second sequence 6b.

When the user operates the operation portion 3 from the reference operating position 31 to the second operating position 33, the function is switched from the first function 61 to the fourth function 64 according to the second sequence 6b. When the user subsequently operates from the reference operating position 31 to the second operating position 33, the function is switched from the fourth function 64 to the third function 63. That is, each time the user operates to the second operating position 33, the function is switched from the first function 61, to the fourth function 64, to the third function 63, and to the second function 62. In the second sequence 6*b*, the function is switched from the first function 61 to the fourth function 64 in a looping manner, as shown in FIG. 4B.

Here, as a modification, the operation portion 3 is assigned at least a function of driving the wiper device 853 of the vehicle 8 and, according to the operating positions thereof, is assigned a function of driving the wiper device 853 according to the amount of rainfall, a function of intermittently driving the wiper device 853, a function of continuously driving the wiper device 853 at low speed, a function of continuously driving the wiper device 853 at high speed, and a function of driving the wiper device 853 only when received an operation.

As shown in FIG. 4C, the operation portion 3 is assigned the first function 61 as the function of driving the wiper device 853 of the vehicle 8, the second function 62 as the function of driving according to the amount of rainfall, the third function 63 as the function of intermittently driving, the fourth function 64 as the function of continuously driving at low speed, a fifth function 65 as the function of continuously driving at high speed, and a sixth function 66 as the function of driving the wiper device 853 only when received an operation.

Also in the first sequence 6*a* of this modification, the functions are switched sequentially from the first function 61 to the sixth function 66 by operating in the direction toward the first operating position 32. In the second sequence 6*b*, the functions are switched from the first function 61 to the sixth function 66 and then sequentially from the sixth function 66 to the second function 62.

(Other Modifications)

Figure 6A:
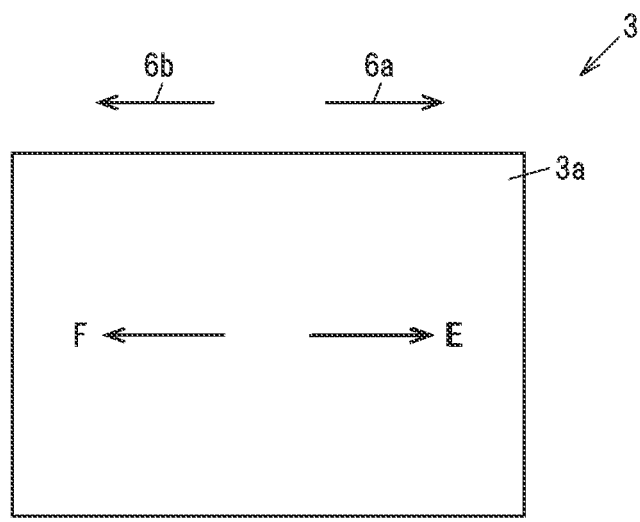
FIG. 6A is a diagram illustrating an example where an operation portion of the lever operation device in a modification is a touchpad.
Figure 6B:
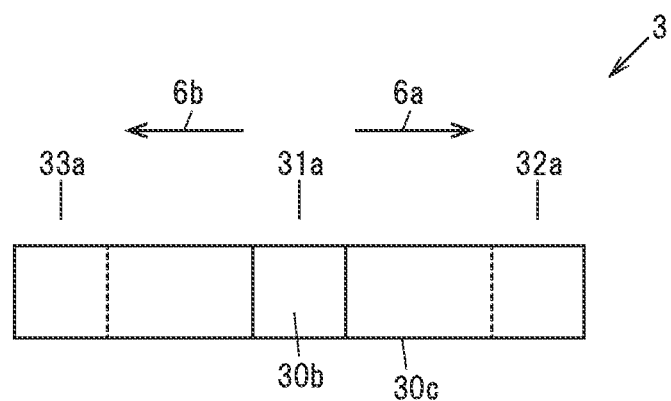
FIG. 6B is a diagram illustrating an example where the operation portion in another modification is a slide switch.

FIGS. 6A and 6B are diagrams illustrating examples of modifications of the operation portion. The operation portion 3 in FIG. 6A is a touchpad 3*a*. The operation portion 3 in FIG. 6B is a slide switch 3*b*.

The touchpad 3*a* is arranged on the back surface 211 of the end portion 21 of the operation lever 20. The touchpad 3*a* has a rectangular operating surface 30*a*, as shown in FIG. 6A. The user can switch the functions in the first sequence 6*a* by performing a tracing operation on the operating surface 30*a* in an arrow E direction. The user can also switch the functions in the second sequence 6*b* by performing a tracing operation on the operating surface 30*a* in an arrow F direction.

The slide switch 3*b* has a slider 30*b*, as shown in FIG. 6B. The slider 30*b* is guided by a route 30*c* and is operable from a reference operating position 31*a* to a first operating position 32*a* and from the reference operating position 31*a* to a second operating position 33*a*.

The user can switch the functions in the first sequence 6*a* by operation the slider 30*b* from the reference operating position 31*a* to the first operating position 32*a* The user can also switch the functions in the second sequence 6*b* by operating the slider 30*b* from the reference operating position 31*a* to the second operating position 33*a*.

As other modifications, the operation portion 3 may include, e.g., a rotary wheel as the operation member 30 arranged in the end portion 21 so as to be partially exposed on the hack surface 211, or may include a cross key or a joystick as the operation member 30 which can be operated in four cross directions.

Effects of the First Embodiment

In a known case where an operation lever does not rotate with a steering wheel, i.e., the operation lever is mounted to a steering column, a user operates the operation lever with, e.g., the hand off the steering wheel since a finger may not reach the operation lever during when operating the steering wheel, hence, operability is not good. However, since the operation lever does not rotate with the steering wheel, it does not come into contact with a leg of the user. On the other hand, in a known case where an operation lever rotates with a steering wheel, the operation lever is within reach of the user's finger even during operating the steering wheel, hence, operability is good. However, when simply reducing the length of the operation lever to prevent contact with the leg of the user since the operation lever rotates with the steering wheel, operability is poor, and when trying to improve the operability, there is a possibility of contact depending on the posture of the user or the type of vehicle, etc.

The lever operation device 1 in the first embodiment is configured to rotate with the steering wheel 80 and is also configured such that the operation lever 20 and the operation portion 3 are included within the allowed existence region 4 that is set by taking into consideration the posture of the user, etc. Therefore, as compared to when such a configuration is not adopted, it is possible to suppress a decrease in operability while avoiding contact with the leg of the user.

In the lever operation device 1, the operation portion 3 can be arranged on the end portion 21 of the operation lever 20 while providing enough operation space to operate the operation portion 3 which is a multi-function switch. The lever operation device 1 in the first embodiment uses a small toggle switch as the operation portion 3 and thus can be arranged in a location where the operation space is narrow and arrangement space is small.

Setting the allowed existence region 4 allows the size of the end portion 21 of the lever operation device 1 to be increased. Therefore, operability of the operation lever 20 via the end portion 21 is better than the case where the allowed existence region is not set.

The gap 5 between the grip portion 82 of the steering wheel 80 and the front surface 210 of the end portion 21 is about the size of one finger. Therefore, if a rotary switch configured to rotate the end portion 21 is arranged on the lever operation device 1, it is difficult to operate it. However, the operation portion 3 allows the lever operation device 1 to operate as many functions as the rotary switch.

The operation portion 3 performs a momentary action and can switch plural functions in the first sequence 6*a* and in the second sequence 6*b*. Therefore, as compared to the case where such a configuration is not adopted, the lever operation device 1 can be assigned more functions than the operating positions and also allows a desired function to be quickly selected.

Second Embodiment

The second embodiment is different from the first embodiment in that the operation portion performs an alternate action.

Figure 7A:
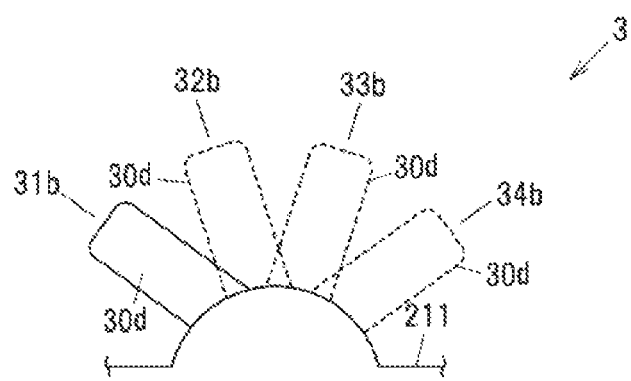
FIG. 7A is a diagram illustrating an example of the operating positions of the lever operation device in the second embodiment.
Figure 7B:
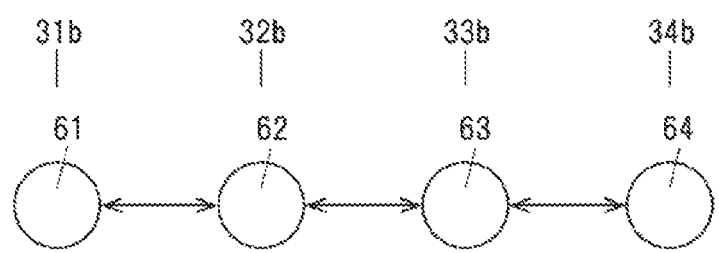
FIG. 7B is a diagram illustrating an example of a switching sequence where four functions are assigned.

FIG. 7A is a diagram illustrating an example of the operation portion, and FIG. 7B is a diagram illustrating an example of switching functions by an alternate action. In the embodiment described below, portions having the same functions and configurations as those in the first embodiment are denoted by the same reference signs as those in the first embodiment and the explanation thereof will be omitted.

The lever operation device 1 in the second embodiment is generally composed of the operation lever 20 which rotates integrally with the steering wheel 80 of the vehicle 8 and receives operations at least in the upward and downward directions and around which the allowed existence region 4 as the predetermined region is set so that the leg of the user seated in the driver's seat 84 does not come into contact therewith when the steering wheel 80 is rotated to the maximum steering angle $\theta_{Max}$, and the operation portion 3 that is arranged on the back surface 211 of the operation lever 20 on an opposite side to the user so as to be located within the allowed existence region 4, has plural operating positions, and switches assigned functions according to an operating position.

The operation portion 3 in the second embodiment has, e.g., an operation member 30*d*, as shown in FIG. 7A. Functions are assigned to the operation portion 3 so as to correspond to the operating positions. That is, the operation portion 3 is configured such that the number of operating positions is the same as the number of assigned functions.

The operation portion 3 is assigned the first to fourth functions 61 to 64 so as to correspond to first and fourth operating positions 31*b* to 34*b* of the operation member 30*d*, as shown in FIG. 7B. The user can switch the function from, e.g., the first function 61 to the second function 62 by operating the operation member 30*d* from the first operating position 31*b* to the second operating position 32*b*. At this time, the operation member 30*d* stays in the second operating position 32*b* without returning to the first operating position 31*b* due to its alternate action.

Effects of the Second Embodiment

The operation portion 3 of the lever operation device 1 in the second embodiment performs an alternate action. Therefore, the operating positions one-to-one correspond to the functions and it is easy to select the function, as compared to the case where such a configuration is not adopted.

The lever operation device 1 in at least one of the embodiments described above can suppress a decrease in operability while avoiding contact with a leg of a user.

Although some embodiments and modifications of the invention have been described, these embodiments and modifications are merely an example and the invention according to claims is not to be limited thereto. These new embodiments and modifications thereof may be implemented in various other forms, and various omissions, substitutions and changes, etc., can be made without departing from the gist of the invention. In addition, not all combinations of the features described in these embodiments and modifications are necessary to solve the problem of the invention. Further, these embodiments and modifications thereof are included within the scope and gist of the invention and also within the invention described in the claims and the range of equivalency.

REFERENCE SIGNS LIST

1 LEVER OPERATION DEVICE
2 LEVER OPERATION UNIT
3 OPERATION PORTION
4 ALLOWED EXISTENCE REGION
5 GAP
6*a* FIRST SEQUENCE
6*b* SECOND SEQUENCE
8 VEHICLE
20 OPERATION LEVER
21 END PORTION
31, 31*a* REFERENCE OPERATING POSITION
32, 32*a* FIRST OPERATING POSITION
33, 33*a* SECOND OPERATING POSITION
31*b*-34*b* FIRST TO FOURTH OPERATING POSITIONS
61-65 FIRST TO FOURTH FUNCTIONS
80 STEERING WHEEL
84 DRIVER'S SEAT
91 LEG
852 LIGHTING DEVICE
853 WIPER DEVICE

The invention claimed is:

1. A lever operation device, comprising:
an operation lever which rotates integrally with a steering wheel of a vehicle and receives operations at least in both upward and downward directions and around which a predetermined region is set so as to prevent the operation lever from contacting with a leg of a user seated in a driver's seat when the steering wheel is rotated to a maximum steering angle; and
an operation portion that is arranged on the operation lever so as not to be located out of the predetermined region and comprises a plurality of operating positions, each of which is assigned an executable function,
wherein the predetermined region is surrounded by a boundary line that defines a gap between a grip portion of the steering wheel and a front surface of the operation lever, a boundary line to prevent the operation lever from contacting with the leg of the user seated in the driver's seat, and a boundary line to prevent an end portion of the operation lever from contacting with a finger of the user when the user grips the grip portion of the steering wheel.

2. The lever operation device according to claim 1, wherein when the steering wheel is viewed from a front side, a boundary of the predetermined region is located inside a boundary of the steering wheel.

3. The lever operation device according to claim 1, wherein the operation portion comprises a mechanical switch comprising the plurality of operating positions.

4. The lever operation device according to claim 1, wherein a gap between the operation lever and the steering wheel is wider than one predetermined finger as a reference for width and narrower than twice a width of the one predetermined finger.

5. The lever operation device according to claim 1, wherein the operation portion is assigned at least a function of turning off and on headlamps and side marker lights of the vehicle and, according to operating positions thereof, is assigned a function of turning off and on the headlamps according to ambient brightness, a function of turning on the side marker lights, and a function of turning on the headlamps.

6. The lever operation device according to claim 1, wherein the operation portion is assigned at least a function of driving a wiper device of the vehicle and, according to operating positions thereof, is assigned a function of driving the wiper device according to an amount of rainfall, a function of intermittently driving the wiper device, a function of continuously driving the wiper device at low speed, a function of continuously driving the wiper device at high speed, and a function of driving the wiper device only when an operation is received.

7. The lever operation device according to claim 1, wherein the maximum steering angle of the steering wheel is in a range of not less than 90° and less than 180° to a left side and a right side of a reference position.

8. A lever operation device, comprising:
an operation lever which rotates integrally with a steering wheel of a vehicle and receives operations at least in upward and downward directions and around which a predetermined region is set so as to prevent the operation lever from contacting with a leg of a user seated in a driver's seat when the steering wheel is rotated to a maximum steering angle; and an operation portion that is arranged on a side surface of the operation lever within the region, comprising a reference operating position and first and second operating positions with the reference operating position therebetween, is assigned a plurality of functions switched in a sequence that is set according an operation, switches the plurality of functions in a first sequence according to a first operation in a direction toward the first operating position, and switches the plurality of functions in a second sequence opposite to the first sequence according to a second operation in a direction toward the second operating position, wherein the predetermined region is surrounded by a boundary line that defines a gap between a grip portion of the steering wheel and a front surface of the operation lever, a boundary line to prevent the operation lever from contacting with the leg of the user seated in the driver's seat, a boundary line to prevent an end portion of the operation lever from contacting with a finger of the user when the user grips the grip portion of the steering wheel, and a surface of a housing to which the operation lever is attached.

9. A lever operation device, comprising:

an operation lever which rotates integrally with a steering wheel of a vehicle and receives operations at least in upward and downward directions and around which a predetermined region is set so as to prevent the operation lever from contacting with a leg of a user seated in a driver's seat when the steering wheel is rotated to a maximum steering angle; and an operation portion that is arranged on a side surface of the operation lever on an opposite side to the user so as to be located within the region, comprising a plurality of operating positions, and switches assigned functions according to an operating position, wherein the predetermined region is surrounded by a boundary line that defines a gap between a grip portion of the steering wheel and a front surface of the operation lever, a boundary line to prevent the operation lever from contacting with the leg of the user seated in the driver's seat, a boundary line to prevent an end portion of the operation lever from contacting with a finger of the user when the user grips the grip portion of the steering wheel, and a surface of a housing to which the operation lever is attached.

* * * * *